(12) United States Patent
Orozco et al.

(10) Patent No.: US 10,714,768 B2
(45) Date of Patent: Jul. 14, 2020

(54) MOTOR VEHICLE WITH A FUEL CELL

(71) Applicant: FORD GLOBAL TECHNOLOGIES, LLC, Dearborn, MI (US)

(72) Inventors: Julio Orozco, Aachen (DE); Arnulf Sponheimer, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 162 days.

(21) Appl. No.: 15/956,004

(22) Filed: Apr. 18, 2018

(65) Prior Publication Data
US 2018/0301719 A1 Oct. 18, 2018

(30) Foreign Application Priority Data
Apr. 18, 2017 (DE) .................. 10 2017 206 507

(51) Int. Cl.
| | | |
|---|---|---|
| *H01M 8/04111* | (2016.01) | |
| *B60L 50/72* | (2019.01) | |
| *H01M 8/04746* | (2016.01) | |
| *B60L 58/40* | (2019.01) | |
| *B60L 1/00* | (2006.01) | |
| *B60L 58/20* | (2019.01) | |
| *H01M 8/04089* | (2016.01) | |
| *H01M 8/04082* | (2016.01) | |
| *H01M 8/0438* | (2016.01) | |
| *H01M 8/04537* | (2016.01) | |
| *H01M 16/00* | (2006.01) | |

(52) U.S. Cl.
CPC ........... *H01M 8/04111* (2013.01); *B60L 1/20* (2013.01); *B60L 50/72* (2019.02); *B60L 58/20* (2019.02); *B60L 58/40* (2019.02); *H01M 8/0441* (2013.01); *H01M 8/04097* (2013.01); *H01M 8/04201* (2013.01); *H01M 8/04402* (2013.01); *H01M 8/04597* (2013.01); *H01M 8/04753* (2013.01); *H01M 16/006* (2013.01); *B60L 2210/10* (2013.01); *H01M 2250/20* (2013.01); *Y02B 90/12* (2013.01); *Y02T 10/6295* (2013.01); *Y02T 10/7005* (2013.01); *Y02T 10/7241* (2013.01); *Y02T 10/92* (2013.01); *Y02T 90/32* (2013.01)

(58) Field of Classification Search
CPC ..................... H01M 8/04111; H01M 10/625
See application file for complete search history.

(56) References Cited

U.S. PATENT DOCUMENTS

| | | |
|---|---|---|
| 5,083,425 A | 1/1992 | Hendriks et al. |
| 7,743,861 B2 | 6/2010 | Grieve |
| | (Continued) | |

FOREIGN PATENT DOCUMENTS

| | | |
|---|---|---|
| DE | 10201510114 A1 | 3/2016 |
| JP | 2005310429 A | 11/2005 |
| JP | 2006286559 A | 10/2006 |

*Primary Examiner* — Olatunji A Godo
(74) *Attorney, Agent, or Firm* — David B. Kelley; Brooks Kushman P.C.

(57) ABSTRACT

The fuel cell system of a motor vehicle has a fuel cell, comprising an anode side and a cathode side, a compressor, which is rotationally connected to a motor and connected by a feed line to the cathode side of the fuel cell, and a turbine, which is connected by an exhaust air line to the cathode side and which furthermore is rotationally connected only to a generator, which is connected at the output side to a second inverter and a low-voltage battery.

10 Claims, 6 Drawing Sheets

(56) References Cited

U.S. PATENT DOCUMENTS

| | | |
|---|---|---|
| 2007/0287046 A1 | 12/2007 | Koda et al. |
| 2015/0233266 A1* | 8/2015 | Firkan ..................... F01K 15/04 60/650 |
| 2016/0046200 A1* | 2/2016 | Timmons ............ B60L 11/1855 318/139 |
| 2016/0315334 A1 | 10/2016 | Kirchoff et al. |
| 2017/0077534 A1* | 3/2017 | Guidry ............... H01M 8/04111 |

* cited by examiner

MOTOR VEHICLE WITH A FUEL CELL

CROSS-REFERENCE TO RELATED APPLICATIONS

This application claims foreign priority benefits under 35 U.S.C. § 119(a)-(d) to DE Application 10 2017 206 507.9, filed Apr. 18, 2017, which is hereby incorporated by reference in its entirety.

TECHNICAL FIELD

In a fuel cell, especially a fuel cell for use in a motor vehicle, the air used as oxidizing agent is supplied at relatively high pressure and in a large quantity per time to the fuel cell. After a pressure drop in the fuel cell, a portion of the air with still considerable kinetic energy flows out from the fuel cell. This exhaust air flow is taken to an exhaust gas turbine. The turbine is connected to a generator. The kinetic energy of this exhaust air flow is thereby utilized to generate electrical energy.

BACKGROUND

In order to achieve a very high output electrical power of the fuel cell, which is tantamount to generating an electric current of large current strength, a high cathode pressure is required. In devices of the prior art, one works with an elevated mass flow of the air compressor; a throttle valve in the outlet line or a regulated bypass valve spanning the fuel cell regulates the cathode pressure of the fuel cell to the desired value.

A relatively high cathode pressure is also required for working at lesser output power in order to satisfy the stoichiometry in the individual cells of the fuel cell. When a bypass valve spanning the fuel cell is used, the maximum cathode pressure can be achieved by closing the bypass valve, for then the total air mass is taken solely to the fuel cell, and/or by increasing the rotational speed of the compressor. However, the value then obtained for the cathode pressure is limited by the design of the technical features of the fuel cell which bring about the pressure drop. The efficiency of the fuel cell becomes less when it is supplied by the compressor with a relatively high air flow.

In JP 2005310429 A a regulator 54 is provided for the generated power, which apparently constitutes an AC/DC converter. This is connected to a battery. The drawing shows an electrical connection from this battery to the compressor/air supply unit. The battery is energized only via the generator. Its power cannot suffice to meet the high power demand of the compressor (if the latter is electrically operated). This architecture is only technically meaningful if the battery is furthermore recharged by a high-voltage circuit.

In JP 2006286559 A a similar architecture is proposed, showing basically two electrical architecture variants. In variant 1, the electrical compressor unit and the exhaust gas turbine are connected via the controller 4 to the high-voltage circuit. In variant 2, the compressor unit and the exhaust gas turbine are connected via a controller 8 to a common energy storage 7 (battery, capacitor bank, etc.). Here as well, this architecture is only technically meaningful if the energy storage 7 is recharged by the high-voltage circuit.

If one wishes to optimize the efficiency of a fuel cell, especially a hydrogen fuel cell, much attention needs to be paid to the electrical energy put into the system, which must be as low as possible. According to the present prior art, a turbocharger with electrical drive and a radial compressor with impeller are used at the input side for the air supply. At the output side, a radial turbine is used, which is driven by the outflowing air. This is mechanically connected to rotate with the shaft of the impeller. The drawback of this arrangement is the lower degree of freedom for the turbine to work in its optimal range regardless of the range of the compressor. One consequence of this is that the measure of recovered kinetic energy is relatively low in the event of slight power demand of the fuel cell from the driving motor of the motor vehicle and relatively low air flow. Furthermore, it is not possible to employ a control of the backpressure of the air other than by using an additional component, such as a control valve at the air outlet of the fuel cell or a system bypass or variable turbine geometry, as indicated in several applications of the prior art. Each of these solutions has a limited degree of free opportunities for controlling the cathode pressure or achieving a higher efficiency.

SUMMARY

Starting from this, the object of the invention is to further develop a fuel cell which is suitable for driving a motor vehicle such that the efficiency is improved, both at high load and also at lesser load, and such that a more optimal control of the operation of the fuel cell is possible.

A radial turbine with impeller is used, which is designed in particular according to the prior art and which is connected only to a generator. In this way, the cathode pressure of the air can be controlled independently by the compressor; this is done, in particular, by regulating the rotary speed of the compressor and/or the number of revolutions of its turbine by means of individual adjustment values and using the cathode pressure, in that the value detected by the sensor for the cathode pressure is compared to a value for an adjustment value or a tabulated value as the variable regulated with the control system for the generator torque.

No additional device is needed for the control of the pressure, such as a regulated bypass valve spanning the fuel cell. One benefit achieved in this way is that the recovery of energy by the turbine coupled to the generator increases with increasing counterpressure at the cathode, which leads to a higher efficiency of the fuel cell for all low and high output powers.

According to the invention, the H2 anode pressure is controlled in the same manner as in the prior art The anode pressure is regulated to a higher differential pressure than that of the cathode. This is done by detecting the anode pressure by means of a sensor. The value detected by this sensor is used to control the anode pressure; this is controlled by a control valve for the pressure of the supplied gas and purge valves for a flushing of the anode.

In a controller of the compressor, the offset for the control of the mass flow of air and the setpoint value for the cathode pressure are used to control the working point for the rotational speed of the compressor.

In a controller for the turbine, the offset for the control of the cathode pressure and the setpoint value for the air flow rate are used to control the rotational speed of the turbine or for the adjustment value of the generator torque.

The combination of an electrical generator at the turbine and an inverter (voltage converter) makes it possible to work in the low-voltage range. By low voltage is meant voltages which can be touched with no problem, in particular voltages up to and including 48 V. At higher voltages, an adequate protection against contact is required. The terms inverter, converter, transformer and voltage converter are used synonymously.

Thus, the average power of a typical fuel cell of a vehicle which can be recovered by the turbine, of 100 kW, is sufficient to meet the energy demand of the fuel cell accessories of the vehicle which operate at low voltage.

Since the low-voltage battery can produce relatively high power for a short time, a further benefit of the arrangement according to the invention is that no converter is required for converting from high voltage to low voltage in the DC voltage/DC voltage range. In this way, the overall costs and also the required design space are also reduced.

In one special embodiment of the invention, a more simple generator, such as one in the form of an alternator with an output power of up to 3 kW and a standard charge regulator with rectifiers, can be used.

By the term battery is meant in particular rechargeable batteries, generally known as storage cells. In general, by battery is meant on the whole electrical charge storages for DC voltage, including capacitor batteries.

According to the invention, the turbine is not mechanically connected to the compressor, i.e., the air supply unit, at its input. An electric motor as generator and an inverter are used to transform the air backpressure at the output into electrical power, in this way achieving a higher energy yield at lower power generated by the fuel cell or lower air throughput.

Since the turbine is decoupled from the compressor side and not mechanically connected to it, it can be set at an optimal rotary speed independently of the input side, which is especially favorable for the energy recovery. The turbine is connected to an electric motor, which is used as a generator and which converts the kinetic energy into electrical power.

A second feature of this arrangement is the regulating of the backpressure of the fuel cell, which can be done by regulating the rotary speed of the generator or the torque of the electric motor and thus the rotary speed (in units of time) of the turbine. A lower rotary speed of the turbine leads to a higher inlet pressure of the turbine and thus to a higher backpressure at the outlet of the fuel cell. The higher outlet pressure leads to an increased cathode pressure of the fuel cell and thus an increase in the quantity which makes it possible for the fuel cell to gain working pressure in order to achieve higher efficiency and a better operating range. The inverter is designed for low voltage. Additional costs for high-voltage certification, safety, and problems associated with higher voltage are avoided.

The invention accomplishes a decoupled regulating of the backpressure in the exhaust gas, which leads to an improved system efficiency, an improved recuperation of the exhaust gas mass or mass flow, elimination of a high-voltage/low-voltage DC/DC converter, and the use of a low-voltage battery as an energy storage (e.g., 12 V or 48 V) in connection with the corresponding turbine/generator system (possibly an alternator with controllable charge regulator).

In the proposed design, the inverter of the motor/compressor unit is connected to the high-voltage circuit and the inverter of the turbine/generator unit is connected to the low-voltage battery. This distinguishes it, for example, from variant 2 of the above-cited JP 2006286559 A.

In addition, the downstream high-voltage/low-voltage converter can be eliminated, thus enabling a decoupling of compressor and turbine unit. In this way, the electrical recuperation power of the generator/turbine unit can be regulated largely independently.

Although the exhaust gas pressure regulation is the primary regulating goal in the regulation and actuation concept, the recuperation power needs to be boosted in the event of high loads of the onboard low-voltage network and the associated drop in the charge state of the low-voltage battery, which at the same time requires an increasing of the charging pressure and the compressor power. The overall efficiency then becomes somewhat less at low electrical loads of the fuel cell.

The regulating strategy in the controller must coordinate the cathode pressure and the battery charge state appropriately.

Sample embodiments of the invention, which are not to be taken as limiting, shall be described more closely below and explained with reference to the drawing, in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 2:
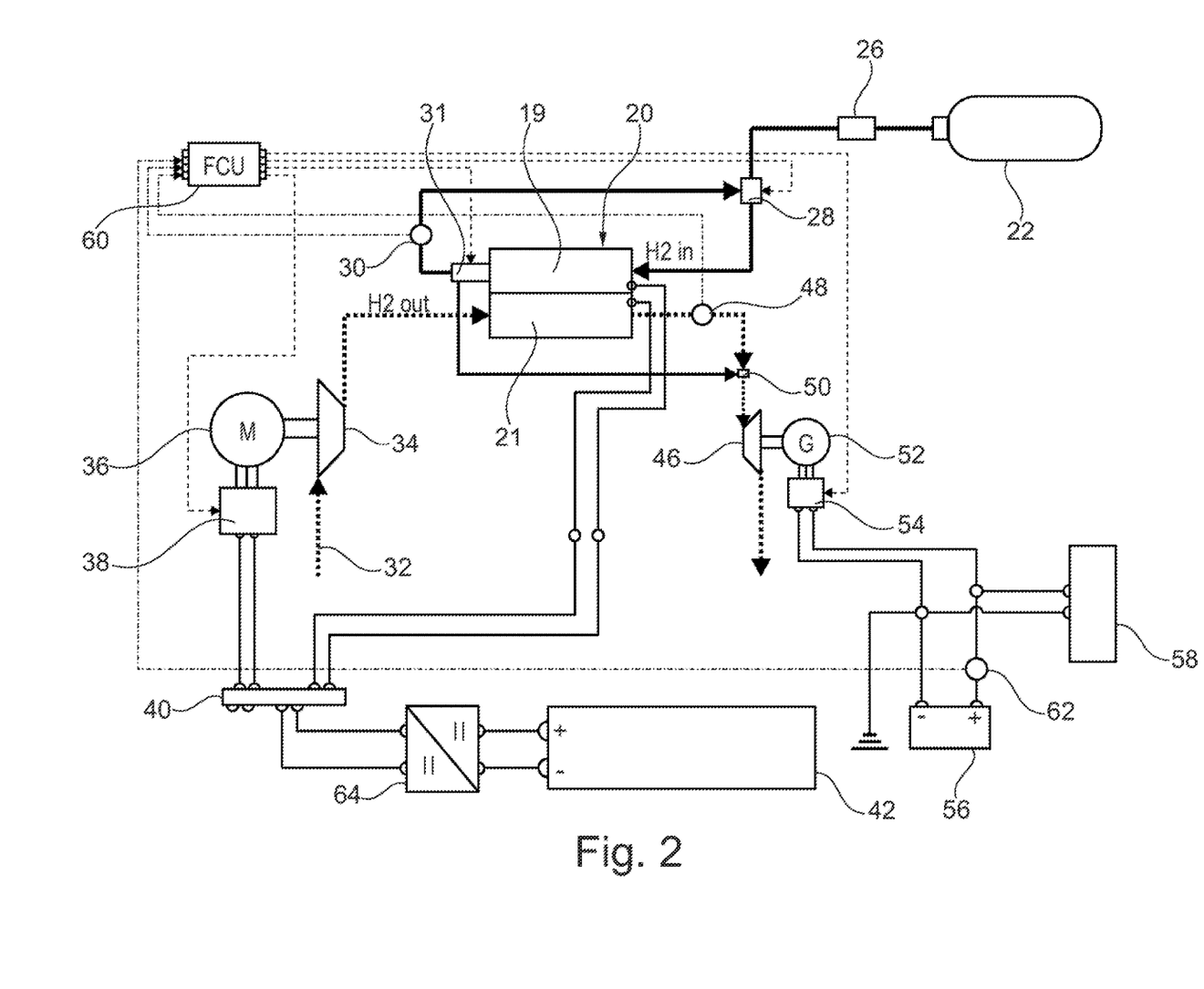
FIG. 2 shows a basic circuit diagram like FIG. 1, but now in a second variant.
Figure 3:
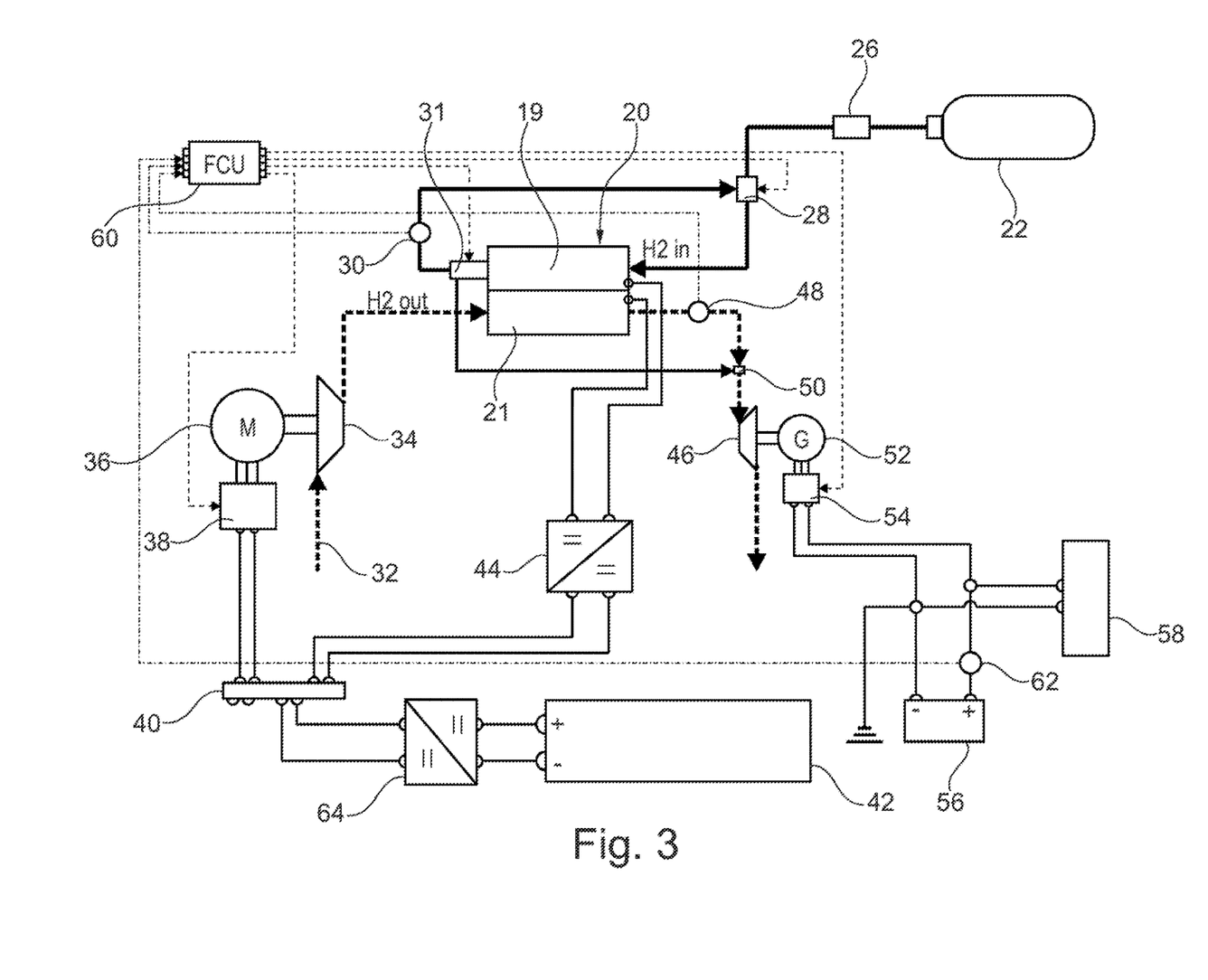
FIG. 3 shows a basic circuit diagram like FIG. 1, but now in a third variant.
Figure 4:
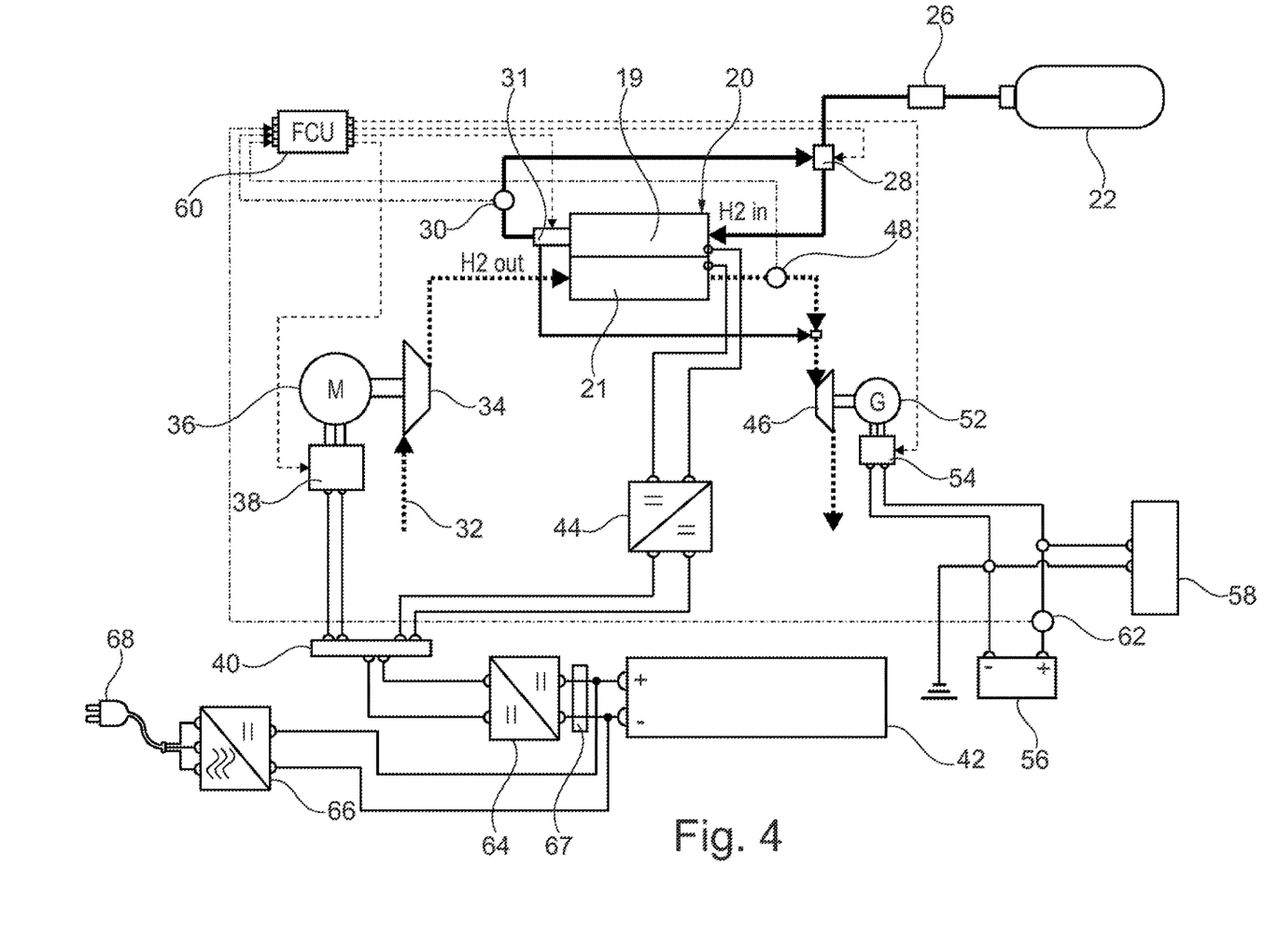
FIG. 4 shows a basic circuit diagram like FIG. 1, but now in a variant for a plug-in hybrid vehicle.

In the following, FIG. 1 shall be described more closely; FIGS. 2 to 4 contain much which agrees with FIG. 1, and therefore these figures are only described insofar as they differ from FIG. 1. After this, we shall address FIGS. 5 and 6.

Figure 1:
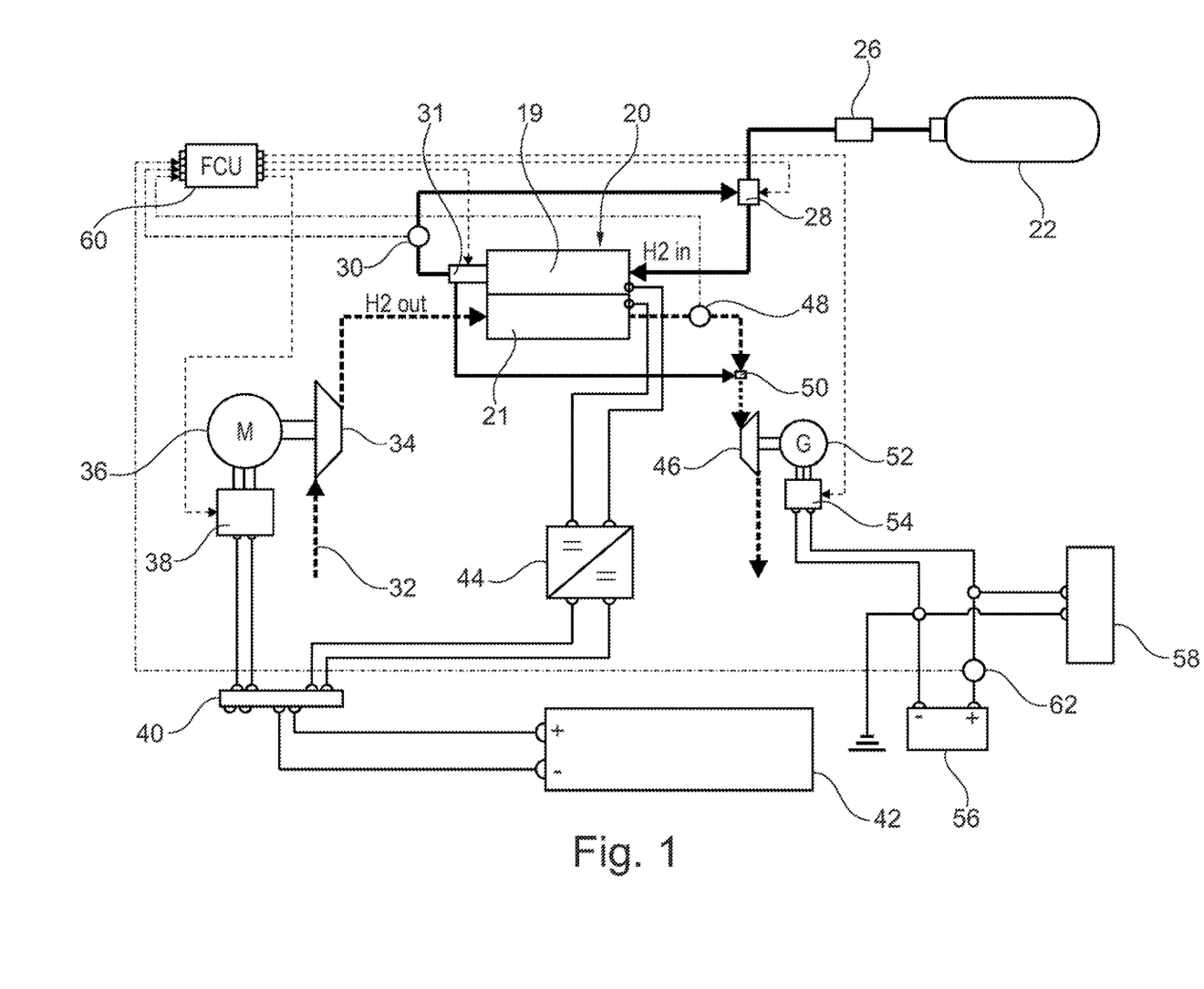
FIG. 1 shows a basic circuit diagram of an architecture for an arrangement with a fuel cell for a hybrid vehicle.

FIG. 1 shows a hydrogen fuel cell 20, represent schematically. At the top of the figure is the anode side 19 or hydrogen side, at the bottom is the cathode side 21, also known as the air side. The two sides receive a flow in opposite directions. The anode side 19 is supplied with hydrogen. For this, a hydrogen tank 22 is provided, in which gas is stored at high pressure. This can be closed by a tank valve and is connected there to a feed line. In this line there is installed a pressure regulator 26. The feed line emerges into the anode side 19, and a jet pump 28 is furthermore installed in the feed line. This may also be designed as a circulation pump or a blower. It serves to take up hydrogen gas flowing from the anode side and carried in an exhaust gas line and feed it back into the feed line in the area of the jet pump 28. In the exhaust gas line there is further provided a pressure sensor 30, which detects the exhaust gas pressure at the outlet of the anode side 19. A differential pressure meter may also be provided, which detects the differential pressure between the anode and the cathode.

The cathode side 21 is charged with air. For this, air is taken in across an air inlet 32 by a compressor 34. The compressor 34 is driven by a motor M 36. Electrically connected upstream from it is a first inverter 38, which also additionally has the function of the motor control. At its primary side, it is connected to a distributor box 40, which in turn is connected to a high-voltage (traction) battery 42. Also connected to the distributor box 40 is the output of a DC/DC converter 44. This is connected at the input side to the fuel cell 20. The electrical power generated by the fuel cell 20 is tapped via the converter 44 and supplied to the high-voltage battery 42 for its charging. From here, the electrical power needed for the propulsion of the vehicle may be tapped, which is prior art and not present here.

At the outlet side, the air flows from the cathode side 21 through an exhaust air line to a turbine 46. This is set in rotation by the kinetic energy of the exhaust air, the air flowing out at an air outlet. A cathode pressure sensor 48 is installed in the exhaust air line.

At the outlet of the anode side 19 there is arranged a purge valve 31, which is directly connected to the fuel cell 20. A purge outlet of this purge valve 31 is connected to a collecting point 50, with which the exhaust air line also stands in communication. In this way, hydrogen gas flows together with the exhaust air during the purging and reaches the turbine 46 together with it. In this way, the kinetic energy of the purge gas is also utilized.

The turbine 46 is drive-connected solely to a generator G 52, and it drives this generator 52. The generator 52 is driven solely by the turbine 46 and is connected solely to it. Downstream from the generator 52 is connected a second inverter 54, which at the same time is also designed as a controller for the generator 52. Its output is connected to a low-voltage (auxiliary) battery 56. At the same time, it is connected to consumers 58 operating at low voltage, said consumers not being shown more closely here. In particular, these are devices belonging directly to the fuel cell 20.

The described arrangement is controlled by an FCU controller 60, which monitors and controls the overall arrangement. For this, it is connected by control lines, shown by dashes, to individual components, especially the second inverter 54, the jet pump 28, the purge valve 31 and the first inverter 38. It receives its input signals across dot-and-dash lines; shown here, for example, are an input line for the pressure sensor (cathode) 48, an input line for the pressure sensor (anode) 30 and an input line for a voltage sensor 62 on the plus side of the low-voltage battery 56. Its minus side is connected to ground.

In the variant of FIG. 2, there is no converter 44, which is the inverter of the fuel cell 20, but instead the electrical output of the fuel cell 20 is connected directly to the distributor box 40. The output voltage of the fuel cell 20 is thus present directly at the first inverter 38. The high-voltage battery 42 is now connected across a second converter 64, which is the converter of the high-voltage battery 42, to the distributor box 40.

In the third variant of FIG. 3, by contrast with FIG. 1, there is additionally provided a second converter 64 between the distributor box 40 and the high-voltage battery 42.

In the diagram of FIG. 4, by contrast with FIG. 3, there is additionally connected to the distributor box 40 a charger 66, which is preferably a charger located on board the vehicle. This can be connected by a plug 68 to a network, such as a household network or a public network. Through the charger 66, the high-voltage battery 42 can be charged. During the charging, the high-voltage battery 42 to be charged is electrically isolated from the second converter 64 by means of the battery contact switch 67.

Figure 5:
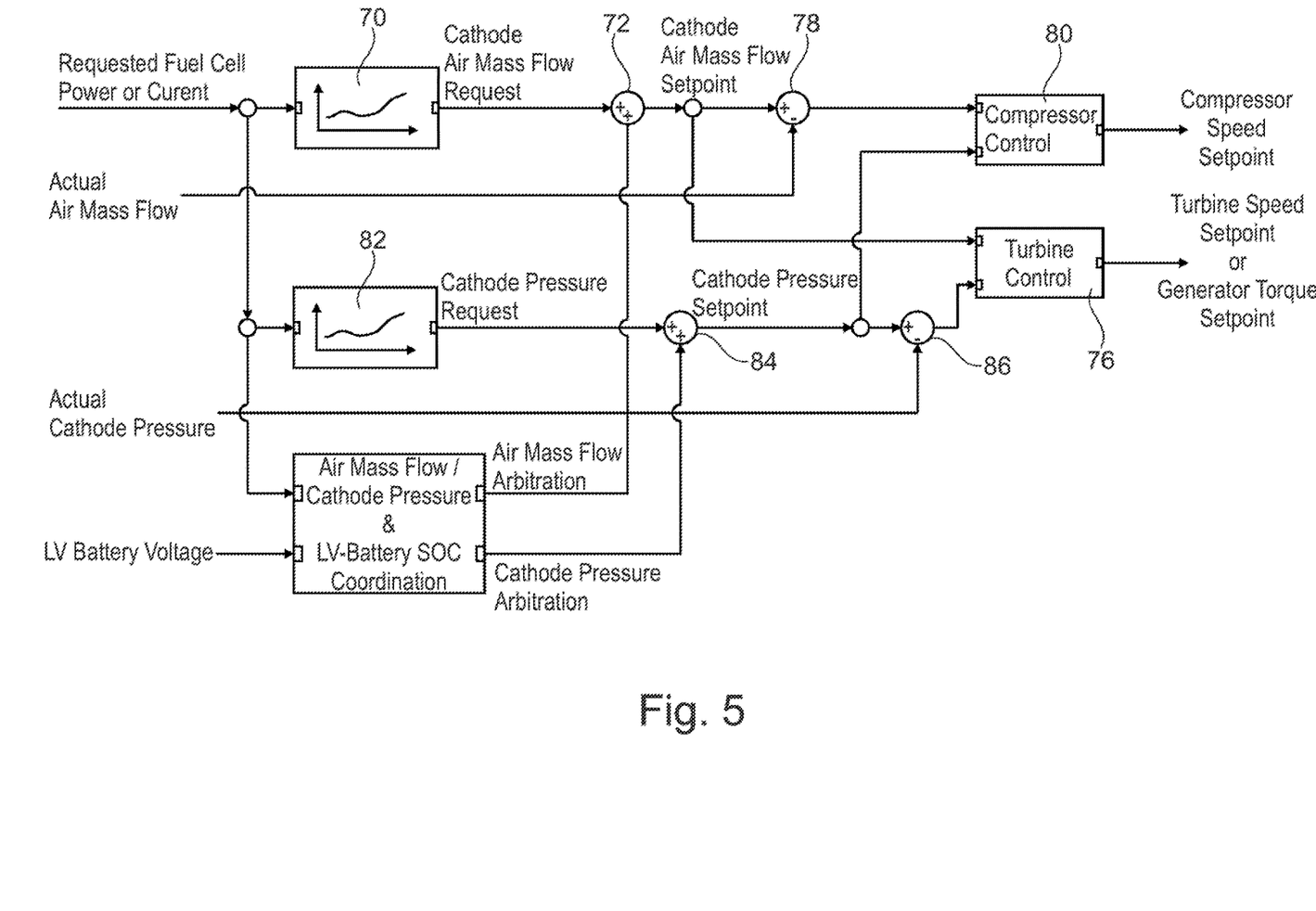
FIG. 5 shows a circuit diagram to explain the regulating of the cathode pressure 8 at the air outlet side.

FIG. 5 shows a block circuit diagram for the sequence of regulating the cathode pressure 48. Based on the currently required power of the fuel cell system or the current demand, a cathode pressure and a setpoint value for the air flow are computed. In addition, a decision offset is determined for both the mass flow of air and the cathode pressure, primarily taking into account the power demand of the fuel cell or the battery voltage and the charge state of the battery. The values for decision offset are added to the adjustment values.

As input variables, four values are supplied to the system at the left side, namely the currently required power of the fuel cell or the required current (requested fuel cell power or current), the measured value of the actual mass flow of air (actual mass flow of air), the measured value of the current cathode pressure (actual cathode pressure) and the measured voltage of the low-voltage battery (LV battery voltage).

The value for the required power is supplied to a first stage 70 in the upper part of the block circuit diagram, in which a required value for the mass flow of air of the cathode (cathode mass flow of air request) is determined, this value being taken to a first combinatorial point 72. Here, it is logically combined with an arbitrary value for the mass flow of air (mass flow of air arbitration), the combinatorial point being positive each time, see the figure. This value is determined in a second stage 74, in which the mass flow of air, the cathode pressure 48 and the charge state of the low-voltage battery 56 are logically combined with each other. At the input side of this second stage 74 are present the voltage signal of the low-voltage battery (LV battery voltage) and the value for the required power. At the output of the first combinatorial point 72 is present an adjustment value for the mass flow of cathode air (cathode mass flow of air setpoint). This value on the one hand is taken directly to a turbine controller 76, and on the other hand logically combined in a second combinatorial point 78 with indicated sign with the measured value for the actual mass flow of air and then taken at the output side to a compressor controller 80. This receives a further input signal, which shall be discussed further below. At the output side, an adjustment value for the rotary speed of the compressor (compressor speed setpoint) is obtained.

The value for the required power is furthermore present at a third stage 82. In this stage, a request value for the cathode pressure 48 (cathode pressure request) is determined, which is provided to a fourth combinatorial point 84. There, it is logically combined in accordance with the indicated sign with the arbitrary value for the cathode pressure 48 (cathode pressure arbitration), which is determined by the second stage 74. At the output side, the fourth combinatorial point 84 is connected on the one hand to a second input of the compressor controller 80, and on the other hand to a fifth combinatorial point 86. Here as well the sign should be indicated. The fifth combinatorial point 86 is furthermore provided with the measured value for the current cathode pressure 48. The output signal of the fifth combinatorial point 86 is provided to the turbine controller 76 as an input value, and the turbine controller 76 determines from its two input values an adjustment value for the turbine rotary speed (turbine speed setpoint) and/or an adjustment value for the generator torque (generator torque setpoint).

Figure 6:
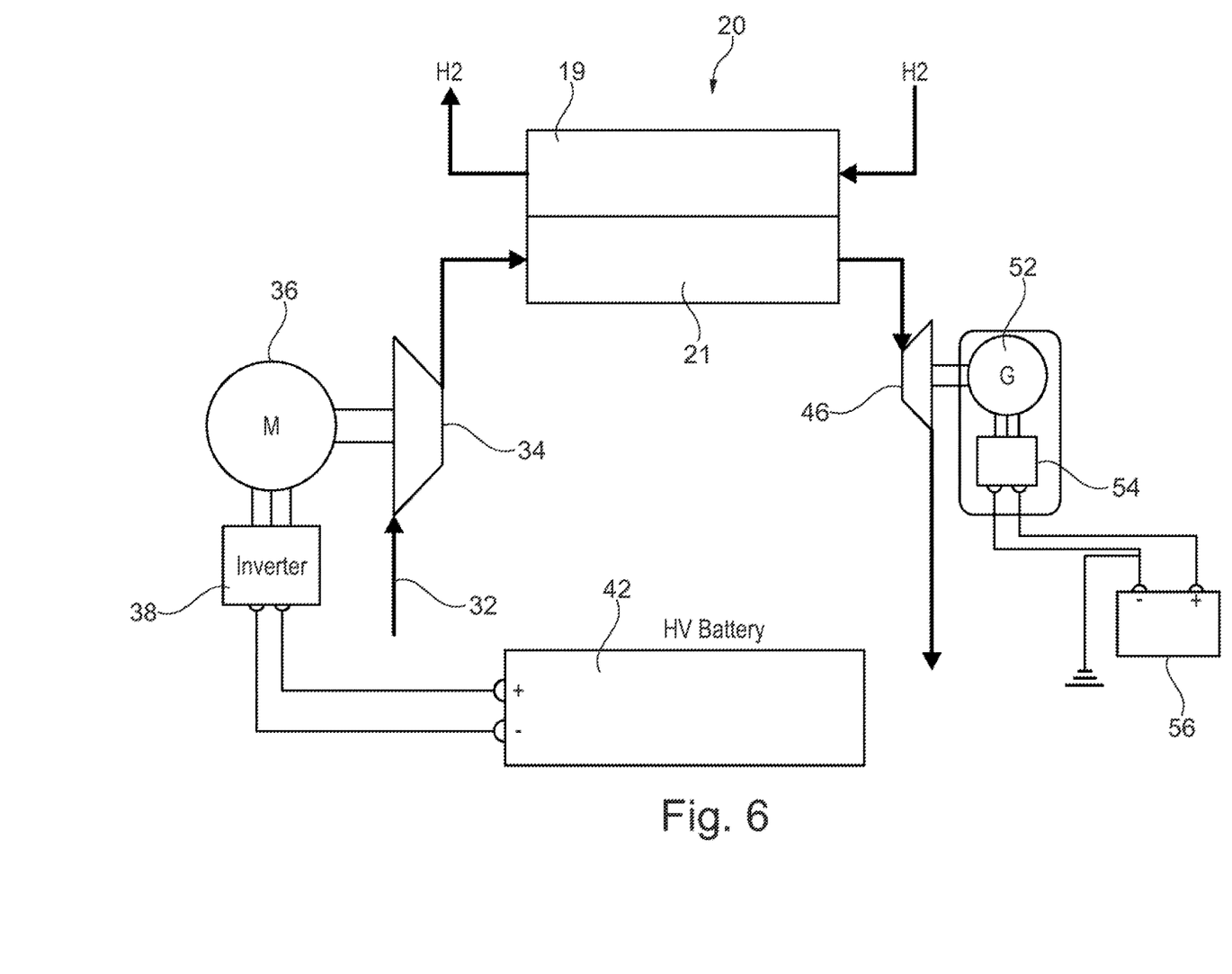
FIG. 6 shows a circuit diagram for an alternator of a vehicle with controllable rectifier.

FIG. 6 finally shows a more concrete sample embodiment for the use of a 3 kW alternator of a motor vehicle in connection with a controllable rectifier. The anode side and the air inlet side of the cathode are as represent in FIG. 1; by contrast with this figure, the first inverter 38 is connected directly to the HV-battery 42, i.e., no distributor box 40 is provided. At the exhaust gas side, once more, there is provided a turbine 46, which is now mechanically connected in rotation with the alternator G. This forms an example of a special configuration of the generator 52. Downstream from the alternator G is connected a controllable rectifier, e.g., a charge regulator, which is an example here of a special configuration of the second inverter 54. At the output side, it is connected to a low-voltage battery 56.

In the method for controlling the fuel cell system, an adjustment value is determined for the rotary speed of the compressor 34 by taking into account an input value for the required power of the fuel cell 20, a measured value of the actual mass flow of air, a measured value of the current cathode pressure 48 and an input value for the voltage of the low-voltage battery 56. Based on the currently required power of the fuel cell 20, a value for the cathode pressure 48 and a setpoint value for the air flow are computed. A decision value is determined both for the mass flow of air and for the cathode pressure, primarily taking into account the power demand of the fuel cell 20 and/or the battery voltage of the low-voltage battery 56.

The fuel cell system of a motor vehicle has a fuel cell 20, comprising an anode side and a cathode side, a compressor 34, which is rotationally connected to a motor M 36 and connected by a feed line to the cathode side of the fuel cell 20, and a turbine 46, which is connected by an exhaust air line to the cathode side and which furthermore is rotationally connected only to a generator G 52, which is connected at the output side to a second inverter 54 and a low-voltage battery 56.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A fuel cell system of a motor vehicle with a fuel cell, comprising:
    a compressor rotationally connected to a motor, and connected by a feed line to a cathode side of the fuel cell;
    a turbine connected by an exhaust air line to the cathode side, and rotationally connected only to a generator that is electrically connected to an auxiliary battery; and
    a traction battery electrically connected to an output of the fuel cell, the auxiliary battery and traction battery lacking a converter therebetween for converting high voltage power to low voltage power, wherein values are set for a mass flow of air and for cathode pressure of the fuel cell according to voltage of the auxiliary battery.

2. The fuel cell system as claimed in claim 1, wherein the traction battery has a second converter electrically connected upstream of the traction battery.

3. A vehicle comprising:
    a compressor, fluidly connected with a gas inlet of a fuel cell, configured to be driven with power from a traction battery;
    a turbine, fluidly connected with a gas outlet of the fuel cell, configured to drive a generator to deliver power to an auxiliary battery; and
    a controller configured to regulate a pressure in the fuel cell via the compressor without a bypass valve spanning the fuel cell and to set a mass flow for the fuel cell based on a voltage of the auxiliary battery.

4. The vehicle of claim 3, wherein the traction battery and auxiliary battery lack a converter therebetween for converting high voltage power to low voltage power.

5. The vehicle of claim 3, wherein an electrical output of the fuel cell is electrically connected with the traction battery.

6. The vehicle of claim 5 further comprising a converter electrically between the electrical output and the traction battery.

7. A vehicle comprising:
    a compressor, fluidly connected with a gas inlet of a fuel cell, configured to be driven with power from a traction battery;
    a turbine, fluidly connected with a gas outlet of the fuel cell, configured to drive a generator to deliver power to an auxiliary battery, the traction battery and auxiliary battery lacking a converter therebetween for converting high voltage power to low voltage power; and
    a controller configured to set a mass flow for the fuel cell based on a voltage of the auxiliary battery.

8. The vehicle of claim 7, wherein the controller is further configured to regulate a pressure in the fuel cell via the compressor without a bypass valve spanning the fuel cell.

9. The vehicle of claim 7, wherein an electrical output of the fuel cell is electrically connected with the traction battery.

10. The vehicle of claim 9 further comprising a converter electrically between the electrical output and the traction battery.

* * * * *